United States Patent [19]
Ross et al.

[11] Patent Number: 5,486,226
[45] Date of Patent: Jan. 23, 1996

[54] SEPARATION OF GASEOUS MIXTURES

[75] Inventors: Ian A. Ross, Guildford; Michael B. Pooley, New Milton, both of England

[73] Assignee: The BOC Group plc, Windlesham, England

[21] Appl. No.: 164,088

[22] Filed: Dec. 8, 1993

[30] Foreign Application Priority Data

Dec. 9, 1992 [GB] United Kingdom ............... 9225680

[51] Int. Cl.⁶ ............................................. B01D 53/053
[52] U.S. Cl. ........................... 95/11; 95/96; 95/103; 95/138; 96/111; 96/133; 96/144
[58] Field of Search .................... 95/8, 11, 12, 96, 95/103, 138; 96/109, 111, 117, 121, 133, 144

[56] References Cited

U.S. PATENT DOCUMENTS

| | | | |
|---|---|---|---|
| 3,923,477 | 12/1975 | Armond et al. | 95/103 |
| 4,144,037 | 3/1979 | Armond et al. | 95/138 X |
| 4,144,038 | 3/1979 | Armond | 95/138 X |
| 4,168,149 | 9/1979 | Armond et al. | 95/96 X |
| 4,256,469 | 3/1981 | Leitgeb | 95/96 |
| 4,348,213 | 9/1982 | Armond | 95/103 |
| 4,349,357 | 9/1982 | Russell | 96/117 X |
| 4,415,340 | 11/1983 | Knoblauch et al. | 95/138 X |
| 4,440,548 | 4/1984 | Hill | 95/138 X |
| 4,472,177 | 9/1984 | Sircar | 95/11 |
| 4,545,790 | 10/1985 | Miller et al. | 96/117 |
| 4,561,865 | 12/1985 | McCombs et al. | 95/96 |
| 4,576,614 | 3/1986 | Armond et al. | 95/96 X |
| 4,857,086 | 8/1989 | Kawai | 96/111 |
| 4,925,461 | 5/1990 | Gemba et al. | 95/138 X |
| 5,015,271 | 5/1991 | Reiss | 95/96 X |
| 5,176,722 | 1/1993 | Lemcoff et al. | 95/138 X |
| 5,223,004 | 6/1993 | Etéve et al. | 95/138 X |
| 5,258,056 | 11/1993 | Shirley et al. | 95/138 X |

FOREIGN PATENT DOCUMENTS 2073043 10/1981 United Kingdom ............... 95/138

*Primary Examiner*—Robert Spitzer
*Attorney, Agent, or Firm*—Coleman R. Reap; Larry R. Cassett

[57] ABSTRACT

A nitrogen PSA system uses a back-fill step only on start-up conditions or when a minor fault has caused the plant to temporarily lose purity. The plant utilizes an oxygen analyzer which controls valves allowing the initiation and cancellation of the back-fill step.

6 Claims, 1 Drawing Sheet

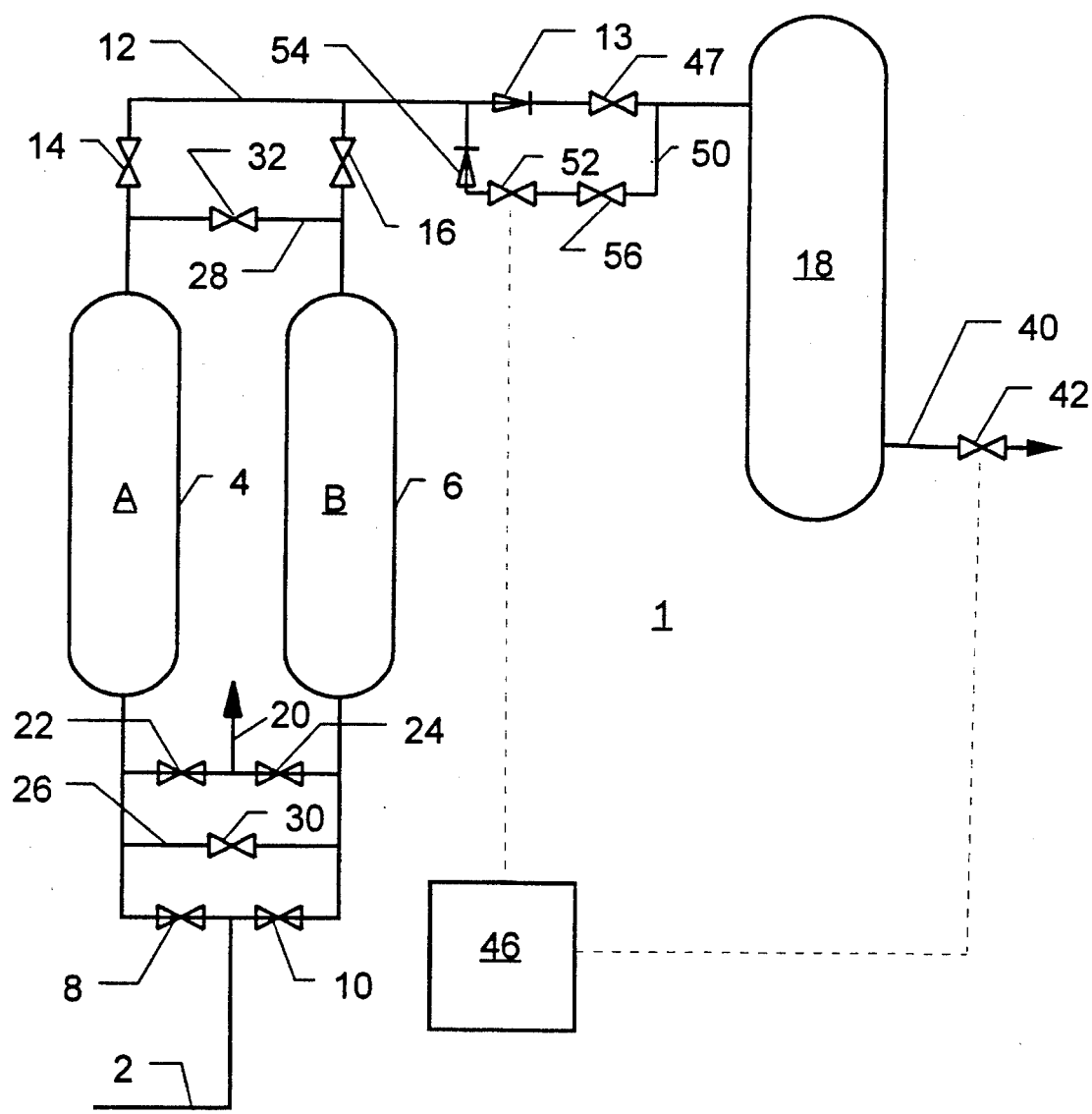

SEPARATION OF GASEOUS MIXTURES

TECHNICAL FIELD

The present invention relates to methods of and apparatus for the separation of gaseous mixtures using pressure swing adsorption techniques (PSA).

BACKGROUND OF THE INVENTION

The present invention is known, for example, from United Kingdom Published Patent Application No. 2073043 to separate nitrogen from air using an adsorbent which has the ability to effect a separation as between the two major components of air by virtue of its more rapid adsorption of oxygen than of nitrogen. The adsorbent is usually molecular sieve carbon contained within a pressure vessel. In operation, a bed of the adsorbent is put through a cycle which includes an adsorption step during which time air is pumped through the bed under pressure and most of the oxygen and a proportion of the nitrogen and substantially all of the carbon dioxide and water vapor in the feed air are adsorbed and a nitrogen rich product gas is supplied from the outlet of the bed; and a desorption or regeneration step during which time the outlet of the bed is closed, the bed is vented to atmospheric pressure usually through its inlet and/or evacuated through its inlet so that the adsorbed gases are substantially removed from the bed thereby preparing it for the next adsorption step.

In practice, it is usual for two adsorbent beds to be employed and operated on similar cycles which are sequenced to be out of phase with one another by 180° so that when one bed is on its adsorption step, the other bed is on its regeneration step and vice-versa. Between the adsorption and the regeneration steps, the pressures in the two beds are equalized by connecting the two bed inlets together and connecting the two bed outlets together. With these connections made, the gas within the void spaces of the bed which has just completed its adsorption step flows into the bed which has just completed its regeneration step by virtue of the pressure difference which exists between the beds at this stage. This equalization step is found to be beneficial in maximizing the product output because the gas in such void spaces will have already become somewhat enriched in nitrogen.

When a PSA plant for the production of nitrogen is initially started or is started after an extended period of shut-down, the plant usually takes a short, but significant time to regain an acceptable and preselected product purity level. This can cause the end user to receive a volume of relatively impure product gas which in some processes could be potentially hazardous or costly.

To minimize the possibility of impure product gas affecting an end user's process a variety of modifications have been proposed and developed. One example is the "fast cycle on start up" which is used to reduce the time taken for a PSA plant to reach preselected purity levels of product gas. Another modification is that some PSA plants have an "off specification vent" which releases relatively impure product gas to atmosphere at a reduced flow rate until the product purity reaches a predetermined level.

The above modifications work satisfactorily for many applications but the fast cycle modification does not prevent the end user receiving a small quantity of low purity product gas albeit for a small period of time and the "off specification vent" will not greatly improve the rate at which desired purity is reached.

It is an aim of the present invention to provide a PSA plant in which the speed with which the plant responds to starting or restarting can be achieved by the use of a back-fill step in the cycle during which product quality gas from a receiver vessel is passed back to the PSA pressure vessel(s) and into the adsorbent beds.

SUMMARY OF THE INVENTION

According to one aspect of the present invention there is provided a method of producing a product gas from a feed gas mixture including the product gas by pressure swing adsorption, which method comprises repeatedly performing the following sequence of steps:

a) passing the feed gas mixture into one end region of a bed of adsorbent material that adsorbs preferentially at least one other component of the gas mixture relative to the product gas;

b) withdrawing from the opposite end of the bed the product gas and passing said product gas into a receiver vessel;

c) desorbing said at least one other component of the feed gas mixture from the adsorbent bed by placing the adsorbent bed in communication with atmosphere or with a vacuum; and in that, the level of purity of the product gas is sensed so that when it falls below a predetermined level the product gas is passed back from the receiver vessel into the bed of adsorbent material during a back-fill step.

Preferably, at least two beds of adsorbent material are employed in which each bed undergoes the said sequence of steps 180° out of phase with the other so that when one bed is on its adsorption step the other bed is on its desorption step and vice versa and wherein upon one bed completing said step b) it is placed in flow communication with the other bed such that there is a gas flow from said one bed to said other bed so as to equalize substantially the pressure therebetween and said gas flow is ended prior to commencement by said one bed of the next step c), and upon said one bed completing a desorption step it is placed in flow communication with the other bed such that there is gas flow from the other bed to said one bed to equalize substantially the pressures therebetween, this gas flow being ended prior to the commencement by said one bed of the next step a); and in that, when the level of purity of the product gas falls below a predetermined level product gas from said receiver vessel passes during the pressure equalization steps into both adsorbent beds.

According to a further aspect of the present invention an apparatus for the production of a product gas from a feed gas mixture including the product gas by pressure swing adsorption comprises a vessel containing an adsorbent bed, said vessel having an inlet pipeline at one of its end regions in communication with a source of the feed gas mixture under pressure, a first outlet pipeline for venting desorbed gases from the bed, and at or adjacent its other end region another outlet pipeline communicating with a receiver vessel for said product gas each of said pipelines having a valve for controlling the flow of gas therethrough; and means for sensing when the purity of the product gas falls below a predetermined level said sensing means sending a signal to a control unit which in turn opens a valve which will permit the flow of product gas from the receiver vessel back to the vessel containing the adsorbent bed.

BRIEF DESCRIPTION OF THE DRAWING

Preferably, two vessels are employed each containing adsorbent material and wherein the control unit is adapted to operate said valve only when the vessels are in gas communication with each other.

DETAILED DESCRIPTION OF THE INVENTION

An embodiment of the invention will now be described by way of example, reference being made to the accompanying diagrammatic drawing which is a schematic diagram of a PSA plant for the separation of nitrogen from air.

As shown, a PSA plant 1 for the production of nitrogen from air includes an air feed line 2 from a compressor (not shown). The air feed line 2 is able to be placed in communication with either one of vessels 4, 6 containing beds A and B of carbon molecular sieve adsorbent. A valve 8 is operable to place the bottom of bed A in communication with the air feed line 2 or to deny such communication. Likewise, a valve 10 is operable to place the bottom of bed B in communication with the air feed line 2 or to deny such communication.

The plant 1 includes an outlet pipe 12 for nitrogen rich product gas in which is located a non-return valve 13 and a manual flow control valve 47. Valves 14, 16 are operable to place the top of the beds A and B respectively in communication with or to deny communication with the pipeline 12. The pipeline 12 extends towards a nitrogen receiver vessel 18.

The plant 1 includes an outlet pipeline 20 for waste gases. A valve 22 is operable to place the bottom of the bed A in communication with the pipeline 20 or deny such communication. Likewise, a valve 24 is operable to place the bottom of the bed B in communication with the pipeline 20 or to deny such communication.

A pipeline 26 connects together the bottoms of the vessels 4, 6 and a pipeline 28 connects together the upper ends of the vessels 4, 6. Valves 30, 32 control the flow of gas between the vessels 4, 6 through the pipelines 26, 28 respectively.

Extending from the nitrogen receiver 18 is a pipeline 40 and located in the pipeline 40 is a valve 42.

An oxygen analyzer with two adjustable volt free contacts (not shown) is located such that in operation it can analyze the product gas leaving the nitrogen receiver 18 via the pipeline 40 and generate a signal which is fed to a control unit 46.

In parallel with a portion of the pipeline 12 is a loop pipeline 50 which by-passes the non-return valve 13 and the manual flow control valve 47 and which includes a valve 52 in series with a non-return valve 54 and flow control valve 56.

As will be explained the control unit 46 controls the operation of the valves 42 and 52 as well as the valves 8, 10; 22, 24; 14, 16 and 30, 32.

During normal use when the product nitrogen purity is above or equal to a preselected level, at the start of an operating cycle the bed A is exposed to atmospheric pressure via pipeline 20 with valve 22 open and the bed B is exposed to maximum pressure being in communication with the compressor via air feed pipeline 2 and open valve 10. The cycle commences with the beds A, B being placed in communication with each other through the pipelines 26, 28 and open valves 30, 32. In this phase of the cycle, valves 8, 10; 14, 16; 22, 24 are all in their closed positions. Since the pressure in bed B is greater than that in bed A, unadsorbed nitrogen-rich gas in the spaces between individual particles of adsorbent in the bed B flows through the pipelines 26, 28 into the bed A. During this phase of the cycle and in all other phases during normal operation of the PSA plant 1 nitrogen product gas is continuously withdrawn from the receiver vessel 18 via pipeline 40 and open valve 42 for use in an end user's process.

After a preset time, usually a few seconds during which the pressures in the vessels 4, 6 are substantially equalized, the control unit 46 generates signals to close valves 30, 32 and to open valves 8, 14 and 24. Feed air under pressure from the compressor will then pass via feed air line 2, valve 8 and into vessel 4 in which the pressure will gradually increase. During this phase, oxygen is adsorbed by the adsorbent in bed A and a nitrogen rich product gas will pass through valve 14, pipeline 12 and non-return valve 13 into the receiver vessel 18. This flow of nitrogen product gas having a purity level equal to or above a predetermined level will continue from the vessel 4 to the receiver vessel 18 for a given period of time usually in the order of one minute.

During the period in which the bed A is in communication with the compressor the bottom of the bed B is in communication with the atmosphere via open valve 24 and pipeline 20. Thus residual unadsorbed gas is vented and adsorbed gas, mainly oxygen is desorbed and vented also. By this means the adsorbent in the bed B is regenerated ready for the next adsorption step.

The next step in the cycle is a further equalization step of the pressure in the vessel 4, 6. The equalization step is initiated by the control unit 46 which generates signals to close valves 8, 14 and 24 and to open valves 30, 32. This pressure equalization step of the operating cycle is analogous to the first equalization step previously described with the difference that the flow of nitrogen rich gas is from bed A to bed B. The duration of this equalization step will be substantially the same as the duration of the first equalization step.

At the end of this latest equalization step the valves 30, 32 are closed and the valves 10, 16 and 22 opened so that bed B commences its adsorption step whilst bed A commences its regeneration or desorption step.

During the entire cycle as described above nitrogen product gas is being withdrawn from the receiver vessel 18 through the open valve 42 and pipeline 40 for use in a user's process.

In the event, that the purity of product nitrogen falls below a predetermined level, for example, when restarting the PSA plant 1 after a period of shut down, the volt free contacts in the oxygen analyzer switch over one at a time. The first volt free contact opens the valve 52 and the second volt free contact closes the valve 42. Thus, low purity nitrogen is prevented from leaving the nitrogen receiver vessel 18 and the opening of the valve 52 permits the back-filling of either vessel 4 or 6 following an equalization step of the PSA plant 1. The rate of back-fill can be optimized using the flow control valve 56. At the time the valve 52 is opened a timer is operated in the control unit 46 so that if the required purity level is not regained within a predetermined time the PSA plant 1 shuts down and a major alarm operates.

When the process begins to regain the predetermined level of purity the contacts operate to open valve 42 thereby allowing the end user to start taking high quality product gas from the nitrogen receiver 18 and as the plant resumes normal running conditions the second volt free contact switches back so that the valve 52 is closed and the back-fill step is cancelled.

It will be apparent that the embodiment of the pressure swing adsorption plant described above enables the back-fill step to be used efficiently so that product gas of lower than a predetermined level of purity cannot be delivered to the user, start-up time is kept to an absolute minimum, PSA plant sizing is not affected and plant shut downs due to purity loss are reduced.

The embodiment described is a two bed pressure swing adsorption plant. However, it will be apparent that the advantage of the back-fill of product gas in the vessels containing the adsorbent material will be equally beneficial in a single vessel plant.

From the forgoing, it will be appreciated that, although specific embodiments of the invention have been described herein for purposes of illustration, various modifications may be made without deviating from the spirit and scope of the invention. Accordingly, the invention is not to be limited except as by the appended claims.

We claim:

1. A method of producing a product gas from a feed gas mixture including the product gas by pressure swing adsorption, which method comprises repeatedly performing the following sequence of steps:

a) passing the feed gas mixture into one end region of a bed of adsorbent material that adsorbs preferentially at least one other component of the gas mixture relative to the product gas;

b) withdrawing from the opposite end of the bed the product gas and passing said product gas into a receiver vessel;

c) desorbing said at least one other component of the feed gas mixture from the adsorbent bed by placing the adsorbent bed in communication with atmosphere or with a vacuum; and in that, the level of purity of the product gas is sensed so that when it falls below a predetermined level the product gas is passed back from the receiver vessel into the bed of adsorbent material during a back-fill step.

2. A method as claimed in claim 1, employing at least two beds of adsorbent material in which each bed undergoes the said sequence of steps 180° out of phase with the other so that when one bed is on its adsorption step the other bed is on its desorption step and vice versa and wherein upon one bed completing said step b) it is placed in flow communication with the other bed such that there is a gas flow from said one bed to said other bed so as to equalize substantially the pressures therebetween and said gas flow is ended prior to commencement by said one bed of the next step c), and upon said one bed completing a desorption step it is placed in flow communication with the other bed such that there is gas flow from the other bed to said one bed to equalize substantially the pressures therebetween, this gas flow being ended prior to the commencement by said one bed of the next step a); and in that, when the level of purity of the product gas falls below a predetermined level product gas from said receiver vessel passes following the pressure equalization steps into said one adsorbent bed.

3. A method as claimed in claims 1 or 2, in which the product gas is nitrogen and the feed gas mixture is air.

4. An apparatus for the production of a product gas from a feed gas mixture including the product gas by pressure swing adsorption comprising a vessel containing an adsorbent bed, said vessel having an inlet pipeline at one of its end regions in communication with a source of the feed gas mixture under pressure, a first outlet pipeline for venting desorbed gases from the bed, and at or adjacent its other end region another outlet pipeline communicating with a receiver vessel for said product gas each of said pipelines having a valve for controlling the flow of gas therethrough; and means for sensing when the purity of the product gas falls below a predetermined level said sensing means sending a signal to a control unit which in turn opens a valve which will permit the flow of product gas from the receiver vessel back to the vessel containing the adsorbent bed.

5. An apparatus as claimed in claim 4, in which the sensing means is an oxygen analyzer with at least two adjustable volt free contacts.

6. An apparatus as claimed in claim 5, in which the receiver vessel has an outlet pipeline, the flow of product gas therethrough being controlled by a valve, and in that one volt free contact controls the valve permitting the flow of product gas from the receiver vessel back to the vessel(s) containing the adsorbent bed(s) whilst the other volt free contact controls the valve in the receiver vessel outlet pipeline.

\* \* \* \* \*